(12) United States Patent
Yamada

(10) Patent No.: US 10,840,021 B2
(45) Date of Patent: *Nov. 17, 2020

(54) MULTILAYER CERAMIC ELECTRONIC COMPONENT

(71) Applicant: Murata Manufacturing Co., Ltd., Nagaokakyo (JP)

(72) Inventor: Mayumi Yamada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,283

(22) Filed: Aug. 20, 2019

(65) Prior Publication Data

US 2019/0378654 A1 Dec. 12, 2019

Related U.S. Application Data

(63) Continuation of application No. 15/822,654, filed on Nov. 27, 2017, now Pat. No. 10,510,486.

(30) Foreign Application Priority Data

Nov. 28, 2016 (JP) .................................. 2016-230112

(51) Int. Cl.
*H01G 4/232* (2006.01)
*H01G 4/30* (2006.01)
*H01G 2/06* (2006.01)
*H01G 4/12* (2006.01)

(52) U.S. Cl.
CPC ........... *H01G 4/2325* (2013.01); *H01G 2/065* (2013.01); *H01G 4/30* (2013.01); *H01G 4/12* (2013.01)

(58) Field of Classification Search
CPC .......... H01G 4/232; H01G 4/228; H01G 4/30; H01G 4/2325
See application file for complete search history.

(56) References Cited

U.S. PATENT DOCUMENTS 10,510,486 B2 * 12/2019 Yamada ................. H01G 4/232
2007/0215379 A1 * 9/2007 Komatsu .............. H01G 4/2325
174/258

(Continued)

OTHER PUBLICATIONS

Yamada, "Multilayer Ceramic Electronic Component", U.S. Appl. No. 15/822,654, filed Nov. 27, 2017.

*Primary Examiner* — Eric W Thomas
(74) *Attorney, Agent, or Firm* — Keating & Bennett, LLP (57) ABSTRACT

A multilayer ceramic electronic component includes a multilayer body that includes a second main surface defining and functioning as a mounting surface. Outer electrodes include underlying electrode layers including a conductive metal and a glass component and conductive resin layers including a thermosetting resin and a metal component. The underlying electrode layers extend from first and second end surfaces onto at least the second main surface. The conductive resin layers extend onto the underlying electrode layers provided on the second main surface, portions of the second main surface, and portions of the underlying electrode layers provided on the first end surface and the second end surface and cover portions of the first and second end surfaces, the portions including areas corresponding to about 9% or more and about 82% or less of areas of the first and the second end surfaces.

20 Claims, 6 Drawing Sheets

(56) References Cited

U.S. PATENT DOCUMENTS

| 2013/0050898 A1* | 2/2013 | Seo | H01G 4/30 |
| | | | 361/321.2 |
| 2015/0021073 A1* | 1/2015 | Kim | H01G 4/30 |
| | | | 174/258 |

* cited by examiner

MULTILAYER CERAMIC ELECTRONIC COMPONENT

CROSS REFERENCE TO RELATED APPLICATIONS

This application claims the benefit of priority to Japanese Patent Application No. 2016-230112 filed on Nov. 28, 2016. The entire contents of this application are hereby incorporated herein by reference.

BACKGROUND OF THE INVENTION

1. Field of the Invention

The present invention relates to a multilayer ceramic electronic component that includes a multilayer body including a plurality of dielectric layers and a plurality of inner electrode layers, the dielectric layers and the inner electrode layers being laminated, and outer electrodes provided on end surfaces of the multilayer body to be electrically connected to the inner electrode layers.

2. Description of the Related Art

In recent years, ceramic electronic components, such as, multilayer ceramic capacitors, have been used in more severe environments than in the past.

For example, multilayer ceramic capacitors included in mobile devices such as, cellular phones and portable music players are desired to withstand an impact of dropping. Specifically, it is necessary to ensure that the multilayer ceramic capacitors are not detached from mounting substrates and the electronic components do not crack even if the mobile devices are subjected to a drop impact.

Electronic components included in in-vehicle devices, for example, an engine control unit (ECU), are desired to withstand an impact of heat cycles. Specifically, it is necessary to ensure that the multilayer ceramic capacitors do not crack even if the multilayer ceramic capacitors are subjected to a flexural stress generated by thermal expansion and contraction of mounting substrates, the thermal expansion and contraction being due to heat cycles.

In view of this, there has been proposed the use of a thermosetting conductive resin paste for outer electrodes of a multilayer ceramic capacitor. For example, Japanese Unexamined Patent Application Publication No. 11-162771 discloses that an epoxy-based thermosetting resin layer is located between a known underlying electrode layer and a Ni plating layer as a measure to ensure that a multilayer body does not crack even under a severe environment.

Accordingly, when a stress due to an impact of dropping or a flexural stress due to thermal expansion and contraction of a mounting substrate, the thermal expansion and contraction being due to heat cycles, is generated, the stress that propagates through the mounting substrate (deformation of the mounting substrate) is released by causing separation between the underlying electrode layer and the epoxy-based thermosetting resin layer from a leading end of the epoxy-based thermosetting resin layer serving as a starting point so that the multilayer body does not crack.

However, even in the structure disclosed in Japanese Unexamined Patent Application Publication No. 11-162771, when the stress due to an impact of dropping or the flexural stress generated by thermal expansion and contraction of a mounting substrate, the thermal expansion and contraction being caused by heat cycles, is extremely increased, it is difficult to sufficiently release the stress, and the multilayer body cracks in some cases.

Furthermore, the design in which an epoxy-based thermosetting resin layer is located between an underlying electrode layer and a Ni plating layer as in Japanese Unexamined Patent Application Publication No. 11-162771 may be disadvantageous in that the contact resistance between the epoxy-based thermosetting resin layer and the Ni plating layer increases, resulting in an increase in the equivalent series resistance (ESR).

SUMMARY OF THE INVENTION

Preferred embodiments of the present invention provide multilayer ceramic electronic components that are able to achieve significantly reduced ESR while significantly reducing or preventing the formation of cracks in a multilayer body.

A multilayer ceramic electronic component according to a preferred embodiment of the present invention includes a multilayer body that includes a plurality of dielectric layers and a plurality of inner electrode layers, the dielectric layers and the inner electrode layers being laminated, and that includes first and second main surfaces opposite to each other in a lamination direction, first and second side surfaces opposite to each other in a width direction perpendicular or substantially perpendicular to the lamination direction, and first and second end surfaces opposite to each other in a longitudinal direction perpendicular or substantially perpendicular to the lamination direction and the width direction; a first outer electrode provided on the first end surface; and a second outer electrode provided on the second end surface.

In this multilayer ceramic electronic component, the second main surface of the multilayer body defines and functions as a mounting surface.

The first outer electrode includes a first underlying electrode layer and a first conductive resin layer. The second outer electrode includes a second underlying electrode layer and a second conductive resin layer. The first underlying electrode layer and the second underlying electrode layer each include a conductive metal and a glass component. The first conductive resin layer and the second conductive resin layer each include a thermosetting resin and a metal component.

The first underlying electrode layer extends from the first end surface onto at least the second main surface, and the second underlying electrode layer extends from the second end surface onto at least the second main surface.

The first conductive resin layer extends onto the first underlying electrode layer provided on the second main surface, a portion of the second main surface, and a portion of the first underlying electrode layer provided on the first end surface.

The second conductive resin layer extends onto the second underlying electrode layer provided on the second main surface, a portion of the second main surface, and a portion of the second underlying electrode layer provided on the second end surface.

In a multilayer ceramic electronic component according to a preferred embodiment of the present invention, the first and second conductive resin layers respectively cover the first and second underlying electrode layers provided on the second main surface and respectively cover a portion of the first underlying electrode layer on the first end surface and a portion of the second underlying electrode layer on the second end surface. Accordingly, even when a flexural stress is extremely increased, the stress is able to be released not only in the separation between the first underlying electrode layer and the first conductive resin layer on the second main surface and between the second underlying electrode layer and the second conductive resin layer on the second main surface but also in the separation between the first underlying electrode layer and the first conductive resin layer located on the first end surface and between the second underlying electrode layer and the second conductive resin layer located on the second end surface. With this structure, the stress applied to the multilayer body is able to be significantly reduced. Furthermore, since the first conductive resin layer does not cover the entire surface of the first underlying electrode layer on the first end surface, and the second conductive resin layer does not cover the entire surface of the second underlying electrode layer on the second end surface, bonding between a substrate and the first and second underlying electrode layers with a low contact resistance is able to be provided. Therefore, the ESR is able to be significantly reduced.

In a multilayer ceramic electronic component according to a preferred embodiment of the present invention, the first conductive resin layer provided on the portion of the first underlying electrode layer provided on the first end surface covers a portion of the first end surface, the portion including an area corresponding to about 9% or more and about 82% or less of an area of the first end surface, and the second conductive resin layer provided on the portion of the second underlying electrode layer provided on the second end surface covers a portion of the second end surface, the portion including an area corresponding to about 9% or more and about 82% or less of an area of the second end surface. Therefore, a significant reduction in a stress applied to the multilayer body and a significant reduction in the ESR is able to be provided.

In a multilayer ceramic electronic component according to a preferred embodiment of the present invention, the metal component may include a Cu powder or a Ag powder.

According to this multilayer ceramic electronic component, the contact resistance between the substrate and the first and second conductive resin layers is able to be significantly reduced because Cu and Ag provide a relatively low resistance.

In a multilayer ceramic electronic component according to a preferred embodiment of the present invention, a plating layer may be provided on the first and second underlying electrode layers and the first and second conductive resin layers.

According to this multilayer ceramic electronic component, when the multilayer ceramic electronic component is mounted, it is possible to significantly reduce or prevent the first and second underlying electrode layers and the first and second conductive resin layers from being corroded by solder applied to mount the multilayer electronic component, or wettability of solder applied to mount the multilayer electronic component is able to be significantly improved and the multilayer ceramic electronic component is able to be easily mounted on a substrate.

In multilayer ceramic electronic components according to preferred embodiments of the present invention, the formation of cracks in a multilayer body is able to be significantly reduced or prevented, and the ESR is able to be significantly reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings.

It is to be noted that the following preferred embodiments represent examples of the present invention for merely illustrative purposes, and that the present invention is not limited to matters disclosed in the following preferred embodiments. The matters disclosed in the different preferred embodiments are able to be combined with each other in practical applications, and modified preferred embodiments in those cases are also included in the scope of the present invention. The drawings serve to assist understanding of the preferred embodiments, and they are not always exactly drawn in a strict sense. In some cases, for instance, dimension ratios between constituent elements themselves or dimension ratios of distances between elements or features, which are shown in the drawings, are not in match with the dimension ratios described in the Description. Furthermore, some of the elements or features, which are explained in the Description, are omitted from the drawings, or they are shown in a reduced number on a case-by-case basis.

Figure 1:
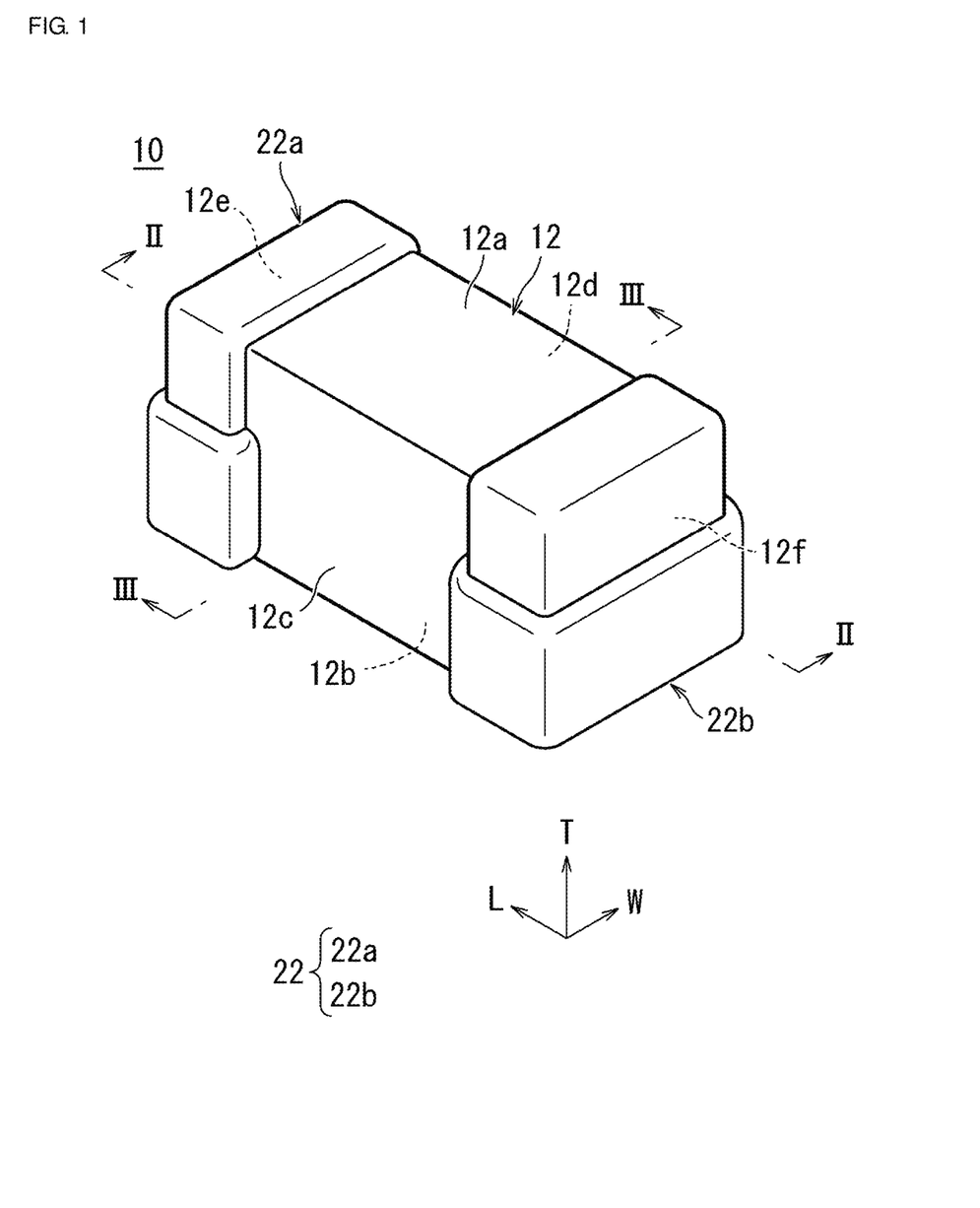
FIG. 1 is a perspective view illustrating a multilayer ceramic capacitor according to a preferred embodiment of the present invention.
Figure 2:
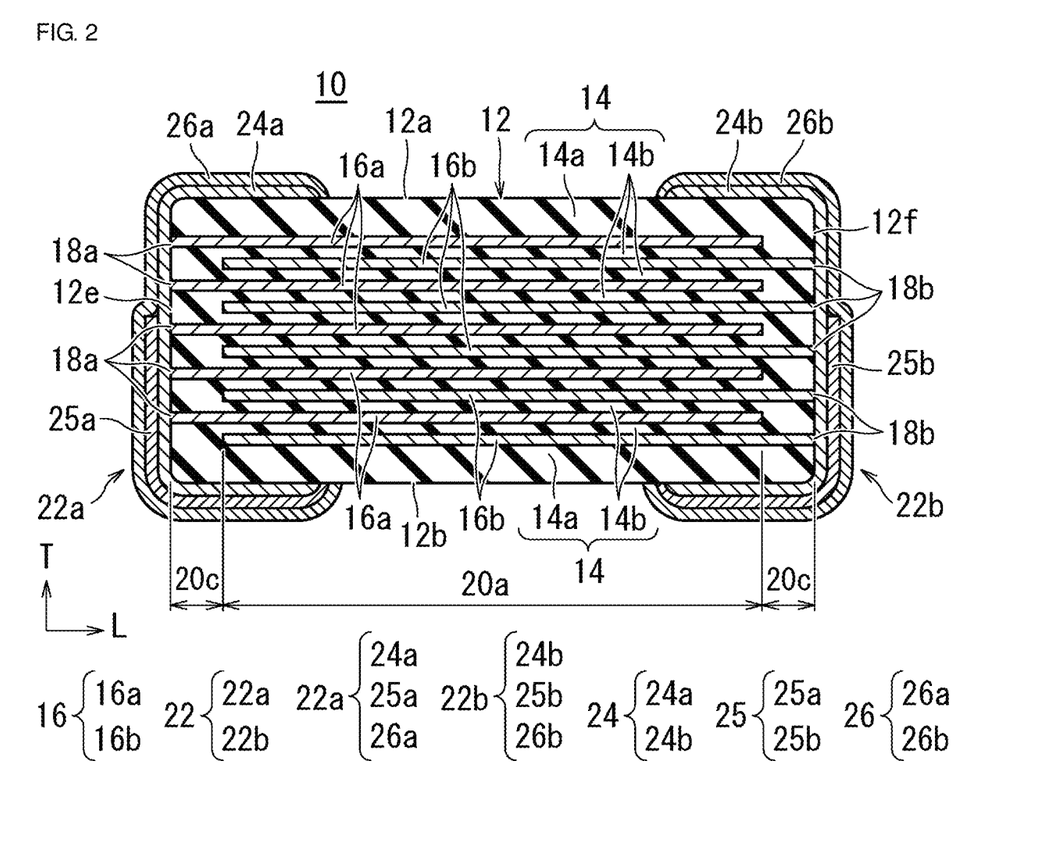
FIG. 2 is a sectional view of the multilayer ceramic capacitor taken along line II-II in FIG. 1.

FIG. 1 is a perspective view illustrating a multilayer ceramic capacitor according to a preferred embodiment of the present invention. FIG. 2 is a sectional view of the multilayer ceramic capacitor taken along line II-II in FIG. 1.

Figure 3:
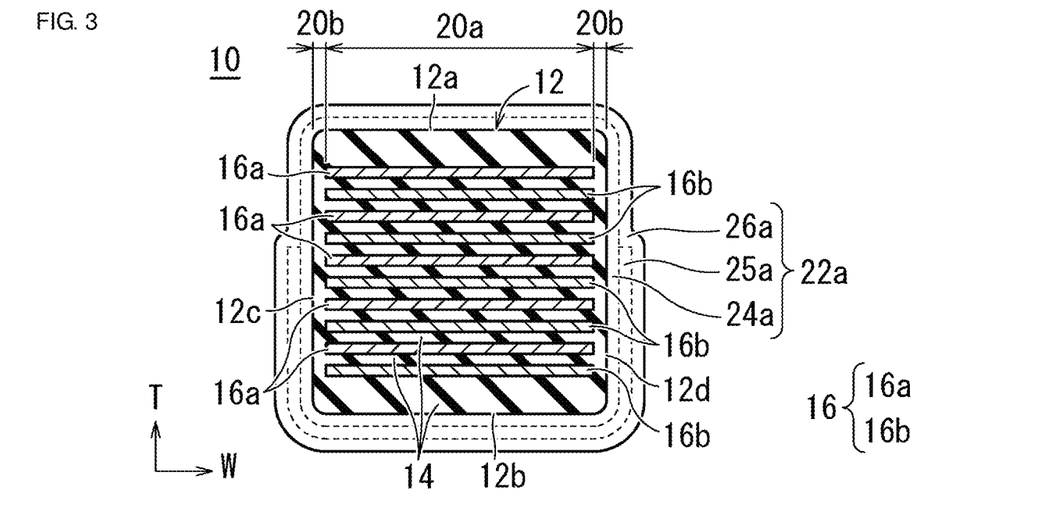
FIG. 3 is a sectional view of the multilayer ceramic capacitor taken along line III-III in FIG. 1.

FIG. 3 is a sectional view of the multilayer ceramic capacitor taken along line III-III in FIG. 1. As illustrated in FIGS. 1, 2, and 3, a multilayer ceramic capacitor 10 includes, for example, a rectangular parallelepiped or a substantially rectangular parallelepiped multilayer body 12. The multilayer body 12 includes a plurality of dielectric layers 14 and a plurality of inner electrode layers 16, the dielectric layers 14 and the inner electrode layers 16 being laminated. Furthermore, the multilayer body 12 includes a first main surface 12a and a second main surface 12b that are provided opposite to each other in a lamination direction T, a first side surface 12c and a second side surface 12d that are provided opposite to each other in a width direction W perpendicular or substantially perpendicular to the lamination direction T, and a first end surface 12e and a second end surface 12f that are provided opposite to each other in a longitudinal direction L perpendicular or substantially perpendicular to the lamination direction T and the width direction W. This multilayer body 12 preferably includes rounded corner portions and rounded ridge portions. The term "corner portion" refers to a portion where adjacent three surfaces of the multilayer body intersect with each other. The term "ridge portion" refers to a portion where adjacent two surfaces of the multilayer body intersect with each other. The first main surface 12a, the second main surface 12b, the first side surface 12c, the second side surface 12d, the first end surface 12e, and the second end surface 12f may include irregularities on a portion or whole thereof. In this preferred embodiment, the second main surface 12b defines and functions as a mounting surface.

Examples of the dielectric material of the dielectric layers 14 of the multilayer body 12 include dielectric ceramics including, as a main component, a perovskite compound, for example, $BaTiO_3$, $CaTiO_3$, $SrTiO_3$, or $CaZrO_3$. Examples thereof further include materials in which a component, for example, a Mn compound, a Fe compound, a Cr compound, a Co compound, or a Ni compound, the compound with a lower content than the main component, is added to the main component. The dimension (thickness) of a single dielectric layer 14, which will be described below, in the lamination direction T is preferably about 0.4 µm or more and about 20 µm or less, for example.

As illustrate in FIG. 2, the dielectric layers 14 include outer layer portions 14a and an inner layer portion 14b. The outer layer portions 14a are located on the first main surface 12a side and the second main surface 12b side of the multilayer body 12. The outer layer portions 14a are the dielectric layer 14 positioned between the first main surface 12a and the inner electrode layer 16 closest to the first main surface 12a and the dielectric layer 14 positioned between the second main surface 12b and the inner electrode layer 16 closest to the second main surface 12b. The region located between the two outer layer portions 14a is the inner layer portion 14b. The dimension (thickness) of an outer layer portion 14a on one side in the lamination direction T is preferably about 10 µm or more and about 300 µm or less, for example. The number of the dielectric layers 14 (the total number of layers of the outer layer portions 14a and the inner layer portion 14b) is preferably about 300 or more and about 700 or less, for example.

As illustrated in FIGS. 2 and 3, the multilayer body 12 includes, as the inner electrode layers 16, a plurality of first inner electrode layers 16a and a plurality of second inner electrode layers 16b. The first inner electrode layers 16a and the second inner electrode layers 16b are embedded and are alternately provided at regular intervals in the lamination direction T of the multilayer body 12.

The inner electrode layers 16 include facing-electrode portions 20a in which the first inner electrode layers 16a and the second inner electrode layers 16b face each other, extended electrode portions 18a extending from the facing-electrode portions 20a to the first end surface 12e of the multilayer body 12, and extended electrode portions 18b extending from the facing-electrode portions 20a to the second end surface 12f of the multilayer body 12.

Specifically, the first inner electrode layers 16a each include, on one end side thereof, an extended electrode portion 18a extending to the first end surface 12e of the multilayer body 12, and the second inner electrode layers 16b each include, on one end side thereof, an extended electrode portion 18b extending to the second end surface 12f of the multilayer body 12. The extended electrode portion 18a on the one end side of the first inner electrode layer 16a is exposed at the first end surface 12e of the multilayer body 12. The extended electrode portion 18b on the one end side of the second inner electrode layer 16b is exposed at the second end surface 12f of the multilayer body 12.

As illustrated in FIGS. 2 and 3, the multilayer body 12 includes side portions 20b (may be referred to as "W gaps") of the multilayer body 12. The side portions 20b are located between the first side surface 12c and one end of each of the facing-electrode portions 20a in the width direction W and between the second side surface 12d and the other end of each of the facing-electrode portions 20a in the width direction W. Furthermore, the multilayer body 12 includes end portions 20c (may be referred to as "L gaps") of the multilayer body 12. The end portions 20c are located between the second end surface 12f and end portions of the first inner electrode layers 16a on the opposite side of the extended electrode portions 18a and between the first end surface 12e and end portions of the second inner electrode layers 16b on the opposite side of the extended electrode portions 18b.

The inner electrode layers 16 may include an appropriate conductive material, for example, a metal, e.g., Ni, Cu, Ag, Pd, or Au or an alloy including at least one of these metals (for example, a Ag—Pd alloy).

The first inner electrode layers 16a and the second inner electrode layers 16b may each include any shape but preferably include a rectangular or a substantially rectangular shape.

The first inner electrode layers 16a and the second inner electrode layers 16b each preferably include a thickness of, for example, about 0.2 µm or more and about 2.0 µm or less.

The number of inner electrode layers 16 is preferably 2 or more and 1,600 or less, for example.

The percentage of the area of an inner electrode layer covering a dielectric layer 14 viewed from the lamination direction T is preferably about 50% or more and about 95% or less, for example.

In this preferred embodiment, the facing-electrode portions 20a of the inner electrode layers 16 face each other with the dielectric layers 14 provided therebetween, to thereby provide an electrostatic capacitance. As a result, characteristics of the capacitor are exhibited.

As illustrated in FIG. 1, an outer electrode 22 is provided on the first end surface 12e side and the second end surface 12f side of the multilayer body 12 to cover the end surfaces. The outer electrode 22 includes a first outer electrode 22a and a second outer electrode 22b.

The first outer electrode 22a is provided on the first end surface 12e side of the multilayer body 12. The second outer electrode 22b is provided on the second end surface 12f side of the multilayer body 12.

Figures 4A, 4B:
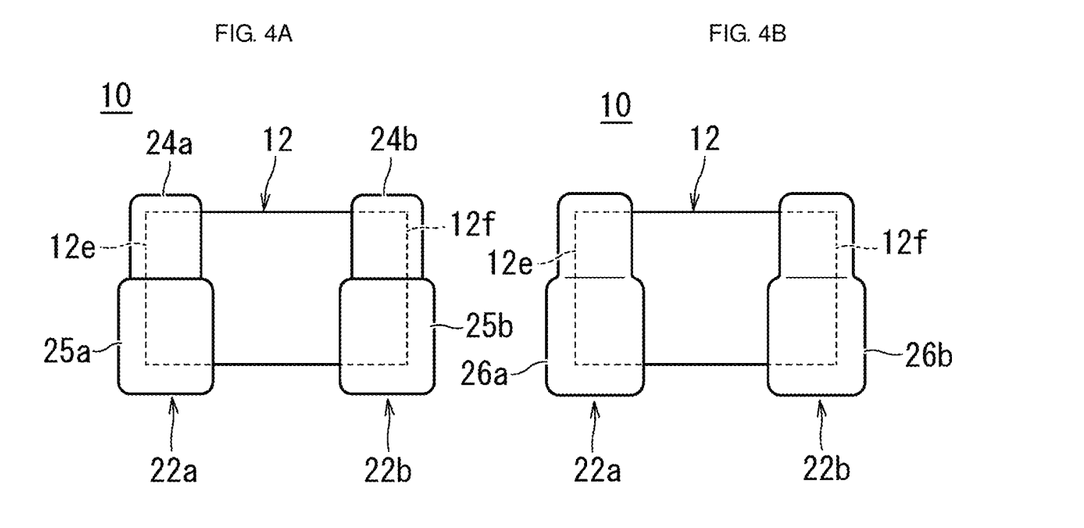
FIG. 4A is a side view of a multilayer ceramic capacitor according to a preferred embodiment of the present invention and illustrates a state before formation of a plating layer.
FIG. 4B is a side view of a multilayer ceramic capacitor according to a preferred embodiment of the present invention and illustrates a state after completion.
Figure 5A:
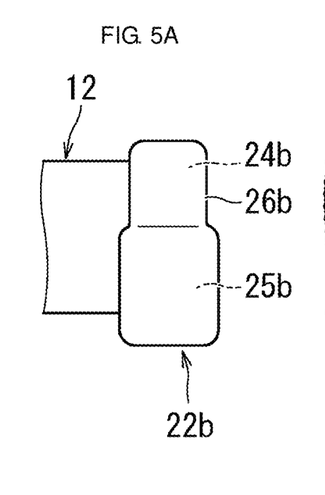
FIG. 5A is a schematic side view of a portion near an outer electrode of a multilayer ceramic capacitor according to a preferred embodiment of the present invention.
Figure 5B:
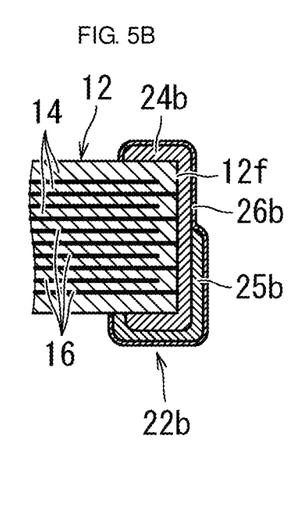
FIG. 5B is a schematic sectional view of a portion near an outer electrode of a multilayer ceramic capacitor according to a preferred embodiment of the present invention.
Figure 5C:
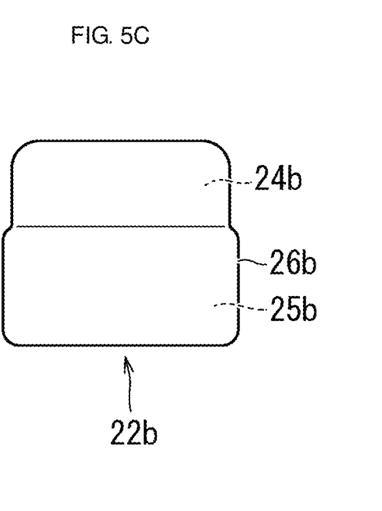
FIG. 5C is a schematic front view of an outer electrode of a multilayer ceramic capacitor according to a preferred embodiment of the present invention, viewed from a longitudinal direction L.

FIG. 4A is a side view of a multilayer ceramic capacitor according to a preferred embodiment of the present invention and illustrates a state before formation of a plating layer. FIG. 4B is a side view of a multilayer ceramic capacitor according to a preferred embodiment of the present invention and illustrates a state after completion. FIG. 5A is a schematic side view of a portion near an outer electrode of a multilayer ceramic capacitor according to a preferred embodiment of the present invention. FIG. 5B is a schematic sectional view of a portion near an outer electrode of a multilayer ceramic capacitor according to a preferred embodiment of the present invention. FIG. 5C is a schematic front view of an outer electrode of a multilayer ceramic capacitor according to a preferred embodiment of the present invention, viewed from a longitudinal direction L.

As illustrated in FIGS. 2 and 5A to 5C, the outer electrode 22 includes an underlying electrode layer 24 including a conductive metal and a glass component and a conductive resin layer 25 including a thermosetting resin and a metal component.

A plating layer 26 is provided on surfaces where the underlying electrode layer 24 is exposed and surfaces where the conductive resin layer 25 is exposed. The plating layer 26 may be omitted, for example.

As illustrated in FIGS. 2, 3 and 4, the underlying electrode layer 24 includes a first underlying electrode layer 24a and a second underlying electrode layer 24b.

The first underlying electrode layer 24a is located on the first end surface 12e side of the multilayer body 12 and preferably extends from the first end surface 12e of the multilayer body 12 onto at least the second main surface 12b. Similarly, the second underlying electrode layer 24b is located on the second end surface 12f side of the multilayer body 12 and preferably extends from the second end surface 12f of the multilayer body 12 onto at least the second main surface 12b. More preferably, the first underlying electrode layer 24a extends to the first end surface 12e, a portion of the second main surface 12b, a portion of the first side surface 12c, and a portion of the second side surface 12d. Similarly, more preferably, the second underlying electrode layer 24b extends to the second end surface 12f, a portion of the second main surface 12b, a portion of the first side surface 12c, and a portion of the second side surface 12d.

The underlying electrode layer 24 includes a conductive metal component and a glass component.

The conductive metal component of the underlying electrode layer 24 includes, for example, at least one selected from Cu, Ni, Ag, Pd, a Ag—Pd alloy, and Au.

The glass component of the underlying electrode layer 24 includes, for example, at least one selected from elements, for example, B, Si, Ba, Mg, Al, and Li. The underlying electrode layer 24 may include a plurality of layers. The underlying electrode layer 24 is formed by applying a conductive paste including the glass component and the conductive metal component to the multilayer body 12 and baking the conductive paste. The underlying electrode layer 24 and the inner electrode layers 16 may be formed by co-firing. Alternatively, the underlying electrode layer 24 may be baked after the inner electrode layers 16 are fired. After baking, the underlying electrode layer 24 preferably includes a thickness (a portion including the largest thickness) of about 5 μm or more and about 150 μm or less, for example.

Regarding the underlying electrode layer 24 provided on the second main surface 12b side, a length of the underlying electrode layer 24 from the first end surface 12e of the multilayer body 12 in the longitudinal direction and a length of the underlying electrode layer 24 from the second end surface 12f of the multilayer body 12 in the longitudinal direction are each preferably about 5 μm or more and about 500 μm or less, for example.

As illustrated in FIGS. 2, 3 and 4, the conductive resin layer 25 includes a first conductive resin layer 25a and a second conductive resin layer 25b. The first conductive resin layer 25a is provided on the first end surface 12e side of the multilayer body 12. The second conductive resin layer 25b is provided on the second end surface 12f side of the multilayer body 12.

The first conductive resin layer 25a preferably extends onto the first underlying electrode layer 24a provided on the second main surface 12b, a portion of the second main surface 12b, and a portion of the first underlying electrode layer 24a provided on the first end surface 12e. Similarly, the second conductive resin layer 25b preferably extends onto the second underlying electrode layer 24b provided on the second main surface 12b, a portion of the second main surface 12b, and a portion of the second underlying electrode layer 24b provided on the second end surface 12f. The first conductive resin layer 25a and the second conductive resin layer 25b may each extend to a portion of the first side surface 12c and a portion of the second side surface 12d. The first conductive resin layer 25a and the second conductive resin layer 25b provided on a portion of the first side surface 12c and a portion of the second side surface 12d may each include any shape. FIGS. 7A to 7F are side views illustrating modifications of shapes of the first conductive resin layer 25a and the second conductive resin layer 25b. As illustrated in FIGS. 7A to 7F, the shape of each of the first conductive resin layer 25a and the second conductive resin layer 25b may be a rectangular or a substantially rectangular shape, a triangular or a substantially triangular shape, a curved shape, for example, a fan shape, or a combination thereof. In addition, the first conductive resin layer 25a may include a different shape than the second conductive resin layer 25b, for example. FIGS. 7A to 7F are shown as the underlying electrode layers 24 and the conductive resin layers 25 are provided on the multilayer body 12 before providing the plating layers 26.

The area ratio may be measured by the method described below.

A photograph of an end surface of a multilayer ceramic capacitor is taken with a microscope. The resulting image is analyzed by WinROOF (software) to calculate the total area of the end surface and the area of a conductive resin layer. The value determined by dividing the area of the conductive resin layer by the total area of the end surface is defined as a resin electrode area ratio.

The thickness of the conductive resin layer 25 on the second main surface 12b side is preferably, for example, about 5 μm or more and about 150 μm or less.

Regarding the conductive resin layer 25 provided on the second main surface 12b side, a length of the conductive resin layer 25 from the first end surface 12e of the multilayer body 12 in the longitudinal direction and a length of the conductive resin layer 25 from the second end surface 12f of the multilayer body 12 in the longitudinal direction are each preferably about 25 μm or more and about 1,000 μm or less, for example.

The conductive resin layer 25 includes a thermosetting resin and a metal component. Since the conductive resin layer 25 includes the thermosetting resin, the conductive resin layer 25 is more flexible than, for example, a plating film or the underlying electrode layer 24 including a fired product of a conductive paste. Therefore, even if a physical impact or an impact due to heat cycles is applied to the multilayer ceramic capacitor 10, the conductive resin layer 25 defines and functions as a buffer layer and is able to significantly reduce or prevent cracking of the multilayer body 12.

Specific examples of the thermosetting resin include various known thermosetting resins, for example, epoxy resins, phenolic resins, urethane resins, silicone resins, and polyimide resins. Of these, epoxy resins, which provide, for example, good heat resistance, moisture resistance, and adhesiveness, are preferably included.

The conductive resin layer 25 preferably includes a curing agent together with the thermosetting resin. Examples of the curing agent of epoxy resins include various known compounds, for example, phenol compounds, amine compounds, acid anhydrides, and imidazole compounds.

As the metal component (hereinafter, referred to as "conductive filler") included in the conductive resin layer 25, Ag, Cu, or an alloy thereof may be included. A metal powder whose surface is coated with Ag may also be included. Preferred examples of the metal powder whose surface is coated with Ag include Cu and Ni powders. A Cu powder treated to significantly reduce or prevent oxidation may also be included. Since the resistances of Cu and Ag are relatively lower than those of other metals, the contact resistance between the conductive resin layer 25 and a substrate decreases. Accordingly, the ESR of the multilayer ceramic capacitor 10 is able to be significantly reduced. A metal coated with Ag is included because the cost of a metal defining and functioning as the base material is able to be significantly reduced while maintaining the characteristics of Ag. The content of the conductive filler is preferably about 35% or more and about 75% or less by volume relative to the total volume of the conductive resin layer 25, for example. The shape of the conductive filler is not limited. The conductive filler may include a spherical or substantially spherical shape, a flat or substantially flat shape, or any other shape. Alternatively, a mixture of a spherical or substantially spherical filler and a flat or substantially flat filler may be included as the conductive filler. The average particle size of the conductive filler is not limited but may be, for example, about 0.3 μm or more and about 10 μm or less. The conductive filler provides the conductive resin layer 25 with electrical conductivity. Specifically, particles of the conductive filler come in contact with each other to define a conduction path in the conductive resin layer 25.

The metal included in the conductive resin layer may include a plurality of types of metal, for example, may include a first metal component and a second metal component. The first metal component preferably includes a metal, for example, Sn, In, or Bi or an alloy including at least one of these metals. Of these, the first metal component more preferably includes Sn or an alloy including Sn. Specific examples of the alloy including Sn include Sn—Ag, Sn—Bi, and Sn—Ag—Cu. The second metal component preferably includes a metal, for example, Cu, Ag, Pd, Pt, or Au or an alloy including at least one of these metals. Of these, the second metal component is preferably Cu or Ag.

As illustrated in FIGS. 2, 3 and 4, the plating layer 26 includes a first plating layer 26a and a second plating layer 26b.

The first plating layer 26a is provided on the first end surface 12e side of the multilayer body 12. The second plating layer 26b is provided on the second end surface 12f side of the multilayer body 12.

The plating layer 26 is provided on the underlying electrode layer 24 and the conductive resin layer 25. Specifically, the plating layer covers portions where the underlying electrode layer 24 is exposed and portions where the conductive resin layer 25 is exposed. The plating layer 26 includes, for example, at least one selected from Cu, Ni, Ag, Pd, Ag—Pd alloys, and Au. The plating layer 26 may include a plurality of layers. The plating layer 26 preferably includes a two-layer structure including a Ni plating layer and a Sn plating layer. By providing a Ni plating layer to cover the underlying electrode layer 24 and the conductive resin layer 25, it is possible to significantly reduce or prevent the underlying electrode layer 24 and the conductive resin layer from being corroded by solder applied to mount multilayer ceramic capacitor 10. Furthermore, by providing the plating layer 26 including a Sn plating layer on the Ni plating layer, when the multilayer ceramic capacitor 10 is mounted, wettability of solder applied to mount the multilayer ceramic capacitor 10 is able to be significantly improved and the multilayer ceramic capacitor 10 is able to be easily mounted on a substrate. The thickness of the plating layer 26 per layer is preferably about 1 μm or more and about 15 μm or less, for example.

The dimensions of the multilayer ceramic capacitor 10 are not limited. For example, the multilayer ceramic capacitor 10 preferably includes a dimension of about 0.25 mm or more and about 3.20 mm or less in the longitudinal direction L, a dimension of about 0.125 mm or more and about 2.50 mm or less in the width direction W, and a dimension of about 0.125 mm or more and about 2.50 mm or less in the lamination direction T.

The first conductive resin layer 25a and the second conductive resin layer 25b preferably extend about 20 μm or more from leading ends of the first underlying electrode layer 24a and the second underlying electrode layer 24b, respectively, and to cover a portion of the second main surface 12b, for example.

As illustrated in FIGS. 1 to 6H, the first conductive resin layer 25a extends onto the first underlying electrode layer 24a provided on the second main surface 12b, a portion of the second main surface 12b, and a portion of the first underlying electrode layer 24a provided on the first end surface 12e, and the second conductive resin layer 25b extends onto the second underlying electrode layer 24b provided on the second main surface 12b, a portion of the second main surface 12b, and a portion of the second underlying electrode layer 24b provided on the second end surface 12f. Accordingly, when deformation of a substrate is generated by a stress, separation occurs between the first underlying electrode layer 24a and the first conductive resin layer 25a on the second main surface 12b and between the second underlying electrode layer 24b and the second conductive resin layer 25b on the second main surface 12b, the second main surface 12b defining and functioning as a mounting surface, and it is possible to significantly reduce or prevent the formation of cracks in the multilayer body 12. Furthermore, the stress is able to be released not only in the separation between the first underlying electrode layer 24a and the first conductive resin layer 25a on the second main surface 12b and between the second underlying electrode layer 24b and the second conductive resin layer 25b on the second main surface 12b but also in separation between the first underlying electrode layer 24a and the first conductive resin layer 25a located on the first end surface 12e and between the second underlying electrode layer 24b and the second conductive resin layer 25b located on the second end surface 12f. With this structure, the stress applied to the multilayer body 12 is able to be significantly reduced. Accordingly, even in the case where a flexural stress is extremely increased, the stress is able to be sufficiently released, and the formation of cracks in the multilayer body 12 is able to be significantly reduced or prevented. Furthermore, since the first conductive resin layer 25a does not cover the entire surface of the first underlying electrode layer 24a on the first end surface 12e, and the second conductive resin layer 25b does not cover the entire surface of the second underlying electrode layer 24b on the second end surface 12f, bonding between a substrate and the underlying electrode layers 24a and 24b with a low contact resistance is able to be provided. Therefore, the ESR of the multilayer ceramic capacitor 10 is able to be significantly reduced.

According to the multilayer ceramic capacitor 10 illustrated in FIGS. 1 to 6H, the first conductive resin layer 25a preferably covers a portion of the first end surface 12e, the portion including an area corresponding to about 9% or more and about 82% or less of an area of the first end surface 12e, and the second conductive resin layer 25b preferably covers a portion of the second end surface 12f, the portion including an area corresponding to about 9% or more and about 82% or less of an area of the second end surface 12f, for example. With this structure, when deformation of a substrate is generated, separation occurs between the first underlying electrode layer 24a and the first conductive resin layer 25a located on the first end surface 12e and between the second underlying electrode layer 24b and the second conductive resin layer 25b located on the second end surface 12f to release a stress applied to the multilayer body 12. Thus, a significant reduction or prevention of cracking is able to be provided. Furthermore, since the first conductive resin layer 25a does not cover the entire surface of the first underlying electrode layer 24a on the first end surface 12e, and the second conductive resin layer 25b does not cover the entire surface of the second underlying electrode layer 24b on the second end surface 12f, bonding between a substrate and the underlying electrode layers 24a and 24b with a low contact resistance is able to be provided. Therefore, the ESR of the multilayer ceramic capacitor 10 is able to be significantly reduced.

According to the multilayer ceramic capacitor 10 illustrated in FIGS. 1 to 6H, the first conductive resin layer 25a extending onto a portion of the first underlying electrode layer 24a provided on the first end surface 12e is preferably located on the first end surface 12e in a height direction extending from the second main surface 12b to the first main surface 12a with respect to the lower surface of the first underlying electrode layer 24a provided on the second main surface 12b defining and functioning as the mounting surface. Similarly, the second conductive resin layer 25b extending onto a portion of the second underlying electrode layer 24b provided on the second end surface 12f is preferably located on the second end surface 12f in the height direction with respect to the lower surface of the second underlying electrode layer 24b provided on the second main surface 12b defining and functioning as the mounting surface. Regarding the height, when the height from the lower surface of the underlying electrode layer 24 provided on the second main surface 12b, which defines and functions as the mounting surface, to the upper surface of the underlying electrode layer 24 provided on the first main surface 12a is assumed to be a height ratio of about 100%, the conductive resin layer 25 preferably covers a portion corresponding to a height ratio of about 3% or more from the lower surface of the underlying electrode layer 24 provided on the second main surface 12b, for example. With this structure, the ESR of the multilayer ceramic capacitor 10 is able to be significantly reduced.

The conductive resin layer 25 preferably covers a portion corresponding to a height ratio of about 9% or more and about 82% or less, for example. With this structure, when deformation of a substrate is generated, separation occurs between the first underlying electrode layer 24a and the first conductive resin layer 25a located on the first end surface 12e and between the second underlying electrode layer 24b and the second conductive resin layer 25b located on the second end surface 12f to release a stress applied to the multilayer body 12. Thus, a significant reduction or prevention of cracking is able to be provided. Furthermore, since the first conductive resin layer 25a does not cover the entire surface of the first underlying electrode layer 24a on the first end surface 12e, and the second conductive resin layer 25b does not cover the entire surface of the second underlying electrode layer 24b on the second end surface 12f, bonding between a substrate and the underlying electrode layers 24a and 24b with a low contact resistance is able to be provided. Therefore, the ESR of the multilayer ceramic capacitor 10 is able to be significantly reduced.

The height ratio is able to be measured according to the process described below.

The multilayer ceramic capacitor 10 is polished until an LT section in the longitudinal direction L and the lamination direction T is exposed at a position corresponding to half the length between the first side surface 12c and the second side surface 12d in the width direction W. Subsequently, an imaginary line is drawn to pass through the lowest point of the lower surface of the underlying electrode layer 24 provided on the second main surface 12b defining and functioning as the mounting surface and to be parallel or substantially parallel to the lower surface of the multilayer body 12. A perpendicular is further drawn from the imaginary line, and the height of the conductive resin layer 25 along the perpendicular is measured with a microscope. In addition, on the LT section, an imaginary line is drawn to pass through the highest point of the upper surface of the underlying electrode layer 24 provided on the first main surface 12a and to be parallel or substantially parallel to the upper surface of the multilayer body 12. The height of the underlying electrode layer 24 located on a perpendicular connecting the imaginary line drawn on the second main surface 12b defining and functioning as the mounting surface and the imaginary line drawn on the first main surface 12a is measured with the microscope. Here, a ratio of the height of the conductive resin layer 25 to the height of the underlying electrode layer 24 is calculated and defined as a resin electrode height ratio.

Next, a non-limiting example of a process for manufacturing the multilayer ceramic capacitor 10 will be described.

First, a step of preparing a multilayer body 12 will be described.

Dielectric sheets and a conductive paste for inner electrodes are prepared. The dielectric sheets and the conductive paste inner electrodes include a binder and a solvent. Known organic binders and organic solvents are able to be included as the binder and the solvent, respectively.

On the dielectric sheets, the conductive paste for inner electrodes is printed to include a predetermined pattern by, for example, screen printing or gravure printing, to thereby define an inner electrode pattern.

A predetermined number of dielectric sheets for outer layers, the dielectric sheets not including an inner electrode pattern thereon, are laminated. Dielectric sheets including an inner electrode pattern thereon are sequentially laminated thereon. A predetermined number of dielectric sheets for outer layers, the dielectric sheets not including an inner electrode pattern thereon, are further laminated thereon. As a result, laminated sheets are prepared.

The resulting laminated sheets are pressed in the lamination direction T by a method, for example, isostatic pressing to prepare a laminated block.

Next, the laminated block is cut into a predetermined size. Thus, a laminated chip, that is, a green multilayer body 12 is cut out. The resulting laminated chip may be subjected to barrel polishing or the like to define corner portions and ridge portions that are rounded.

The laminated chip is fired to prepare the multilayer body 12. The firing temperature is preferably about 900° C. or higher and about 1,300° C. or lower, for example, though it depends on the materials of the dielectric layers 14 and the inner electrode layers 16.

Next, to form the underlying electrode layer 24, a step of applying, to the multilayer body 12, the conductive paste to be connected to the extended electrode portions 18a and 18b is performed. The conductive paste is applied to the first end surface 12e and the second end surface 12f of the multilayer body 12. Furthermore, the conductive paste is applied to a portion of the first main surface 12a, a portion of the second main surface 12b, a portion of the first side surface 12c, and a portion of the second side surface 12d. Subsequently, baking is performed to form the underlying electrode layer 24 of the outer electrode 22. The baking temperature at this time is preferably about 700° C. or higher and about 900° C. or lower, for example. In the case where the conductive paste is applied to the first end surface 12e and the second end surface 12f of the multilayer body 12 and further applied to a portion of the first main surface 12a, a portion of the second main surface 12b, a portion of the first side surface 12c, and a portion of the second side surface 12d, the application of the conductive paste is able to be performed by separately dipping the first end surface 12e and the second end surface 12f in a paste bath. In the case where the conductive paste is applied from the first end surface 12e and the second end surface 12f onto at least the second main surface 12b, the conductive paste is able to be applied to the second main surface 12b, the first end surface 12e, and the second end surface 12f by holding the multilayer body 12 in a slanted orientation and dipping the multilayer body 12 in a paste bath.

Next, to form the conductive resin layer 25, a conductive resin paste including a metal component and a thermosetting resin is applied onto the underlying electrode layer 24 provided on the second main surface 12b side, which is to define and function as a mounting surface, a portion of the second main surface 12b, a portion of the underlying electrode layer 24 located on the first end surface 12e side and the second end surface 12f side, and the underlying electrode layer 24 located on a portion of the first side surface 12c side and the second side surface 12d side, and heat treatment is performed at a temperature of about 250° C. or higher and about 550° C. or lower, for example, to thermally cure the resin. In this case, the conductive resin paste is applied to cover the underlying electrode layer 24 on the second main surface 12b side, which defines and functions as the mounting surface. Regarding a specific method to apply the conductive resin paste, the multilayer body 12 is held in a slanted orientation and dipped in a paste bath to apply the conductive resin paste to the second main surface 12b, the first end surface 12e, and the second end surface 12f. Alternatively, masking is performed to not apply the conductive resin paste onto the first main surface 12a side, and application is performed by dipping the first end surface 12e and the second end surface 12f in a paste bath. In experimental examples described below, the conductive resin layer 25 is formed by the latter method.

During the firing of the multilayer body 12, during baking of the underlying electrode layer 24, and during thermal curing of the conductive resin layer 25, the atmosphere is preferably a $N_2$ atmosphere. Furthermore, in order to significantly reduce or prevent the resin from scattering and to significantly reduce or prevent the metal components from being oxidized, the oxygen concentration is preferably reduced to about 100 ppm or less, for example.

The plating layer 26 is provided on the underlying electrode layer 24 and the conductive resin layer 25. For example, a Ni plating layer is formed by electrolytic plating. Furthermore, in the case where the plating layer 26 includes a two-layer structure, a plating layer, for example, a Sn plating layer is provided on the Ni plating layer.

In accordance with the above-described method that produces a multilayer ceramic capacitor, a plurality of multilayer ceramic capacitors was prepared. A substrate bending resistance test and a measurement of ESR were performed.

Specifically, a plurality of multilayer ceramic capacitors 10 were prepared as Preferred Embodiment Examples with the conductive resin layer 25 covering the underlying electrode layer 24 located on the second main surface 12b side, a portion of the first side surface 12c side, a portion of the second side surface 12d side, the first end surface 12e side, and the second end surface 12f side while changing the resin electrode area ratio. For each of the multilayer ceramic capacitors 10, the substrate bending resistance test and the measurement of ESR were performed.

Parameters other than the resin electrode area ratio of the multilayer ceramic capacitors of the Preferred Embodiment Examples are as follows.

Dimensions of multilayer ceramic capacitor (design values, including outer electrode): The dimension in the longitudinal direction L is about 2.0 mm, the dimension in the width direction W is about 1.25 mm, and the dimension in the lamination direction T is about 1.25 mm.

Dimensions of multilayer body (design values, excluding outer electrode): The dimension in the longitudinal direction L is about 1.68 mm, the dimension in the width direction W is about 1.03 mm, and the dimension in the lamination direction T is about 1.11 mm.

Dielectric material: $BaTiO_3$

Electrostatic capacitance: about 10 μF

Rated working voltage: about 25 V

Conductive material component of inner electrode layers: Ni

Components of underlying electrode layer: Cu and glass

Thickness of underlying electrode layer (central portion on the end surface side): about 70 μm Thickness of underlying electrode layer on first main surface: about 20 μm Thickness of underlying electrode layer on second main surface: about 20 μm Conductive filler component of conductive resin layer: Ag Thermosetting resin of conductive resin layer: epoxy resin Thickness of conductive resin layer (main surface side): about 80 μm Thickness of conductive resin layer (central portion on the end surface side): about 80 μm Component and thickness of first plating layer: Ni, about 4 μm Component and thickness of second plating layer: Sn, about 4 μm Regarding the resin electrode area ratio, refer to Table 1.

Furthermore, a Comparative Example 1 including only the underlying electrode layer 24 (including the plating layer 26) and a Comparative Example 2 in which the entire underlying electrode layer 24 was covered with the conductive resin layer 25 were prepared.

The multilayer ceramic capacitor of the Comparative Example 1 is similar to the multilayer ceramic capacitors of the Preferred Embodiment Examples except that the multilayer ceramic capacitor does not include the conductive resin layer. However, since the conductive resin layer is not provided, the dimensions of the multilayer ceramic capacitor (design values, including outer electrode) are as follows. The dimension in the longitudinal direction L is about 1.84 mm, the dimension in the width direction W is about 1.09 mm, and the dimension in the lamination direction T is about 1.17 mm.

Similarly, the multilayer ceramic capacitor of the Comparative Example 2 is similar to the multilayer ceramic capacitors of the Preferred Embodiment Examples except that the conductive resin layer covered the entire surface of the underlying electrode layer. However, since the conductive resin layer is provided also on the first main surface side, the dimensions of the multilayer ceramic capacitor (design values, including outer electrode) are as follows. The dimension in the longitudinal direction L is about 2.00 mm, the dimension in the width direction W is about 1.25 mm, and the dimension in the lamination direction T is about 1.33 mm.

The shape of the outer electrode is as illustrated in FIGS. 5A to 5C.

FIGS. 6A to 6H are sectional schematic views of portions near the outer electrodes of the Preferred Embodiment Examples and the Comparative Examples, the views schematically illustrating experimental examples in which the resin electrode area ratio of the multilayer ceramic capacitor is changed.

Figure 6A:
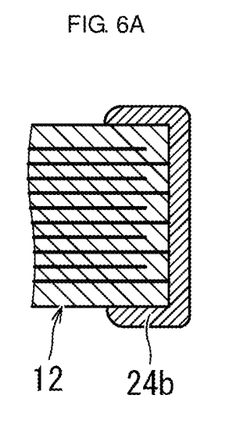
FIGS. 6A to 6H are schematic sectional views each illustrating a portion near an outer electrode, the schematic sectional views schematically illustrating experimental examples in which a resin electrode area ratio of a multilayer ceramic capacitor before formation of a plating layer is changed.
Figure 6B:
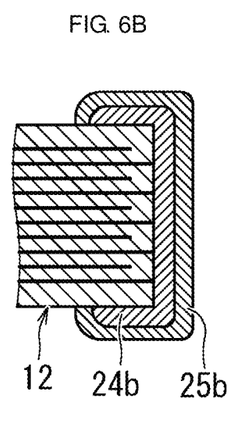
Figure 6C:
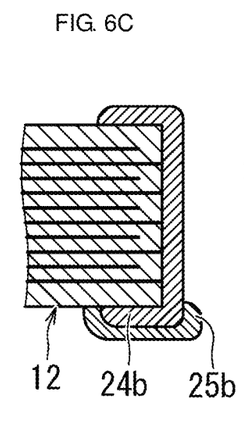
Figure 6D:
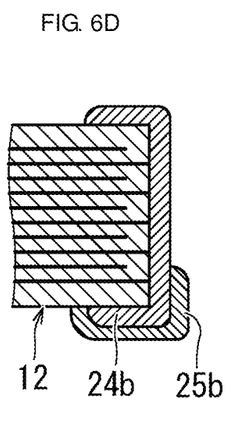
Figure 6E:
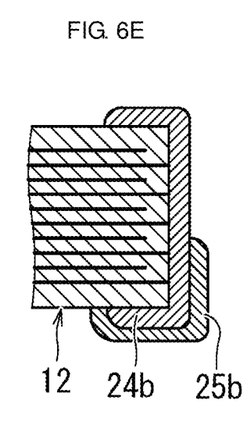
Figure 6F:
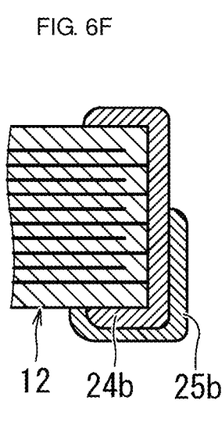
Figure 6G:
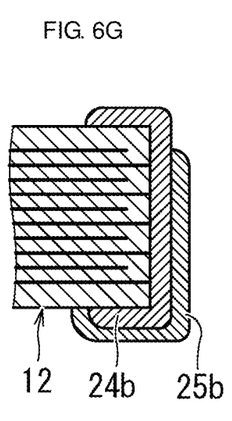
Figure 6H:
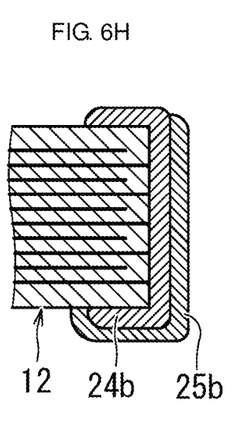
Figure 7A:
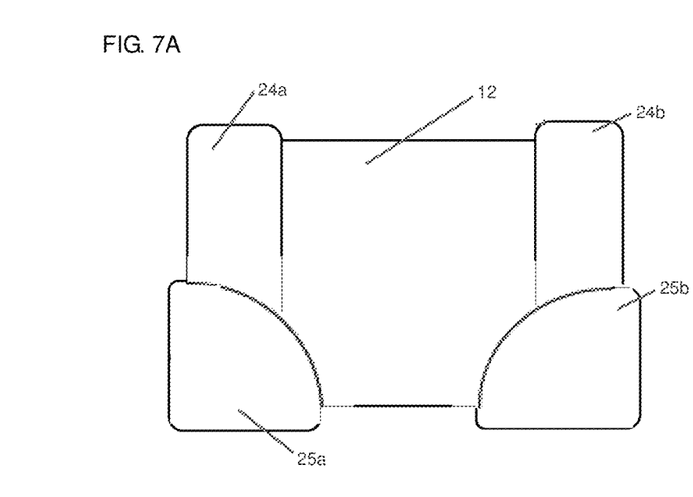
FIGS. 7A to 7F are side views illustrating modifications of shapes of conductive resin layers provided on a portion of a first side surface and a portion of a second side surface.
Figure 7B:
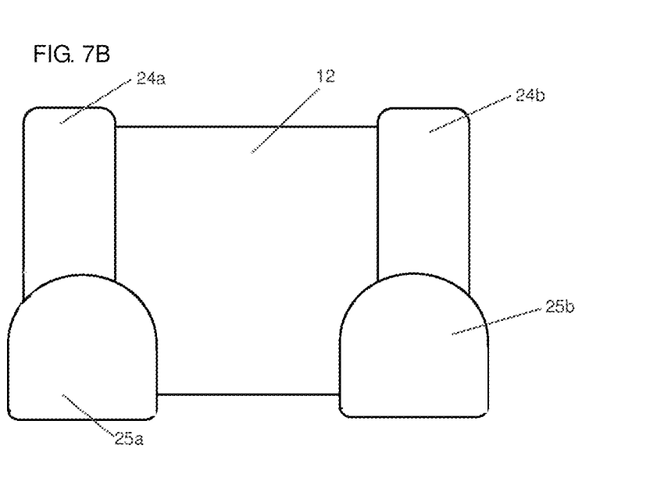
Figure 7C:
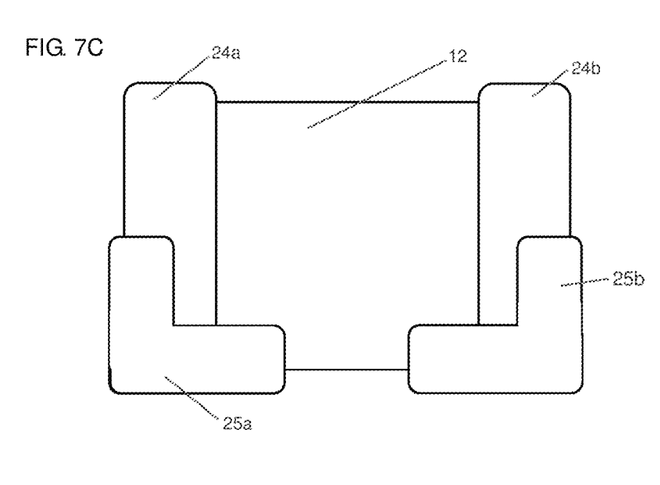
Figure 7D:
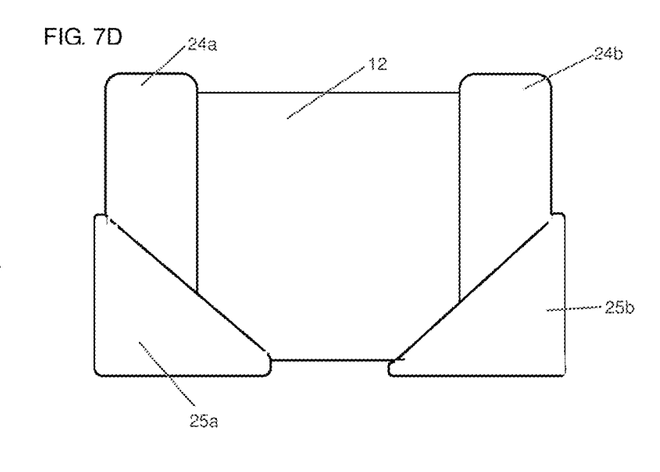
Figure 7E:
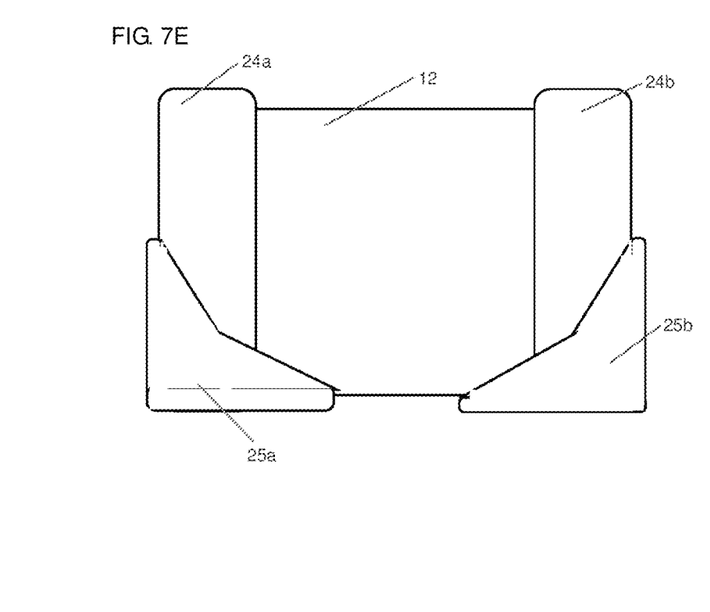
Figure 7F:
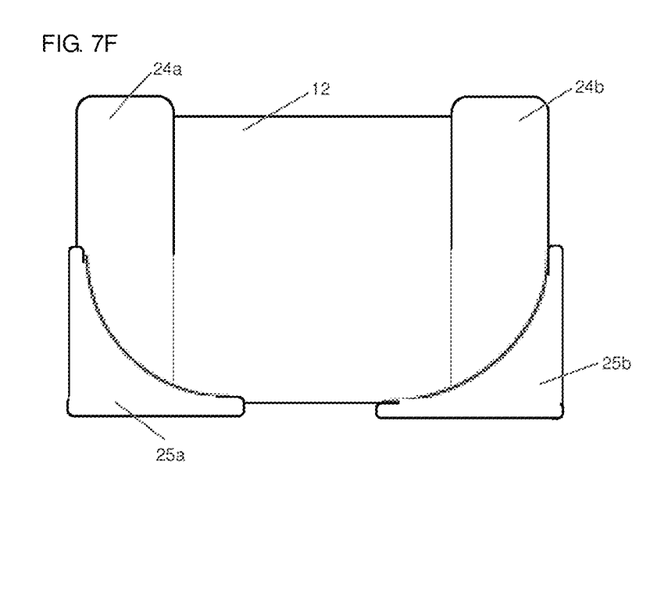

FIG. 6A is a view corresponding to the Comparative Example 1 and illustrates a multilayer ceramic capacitor which includes only an underlying electrode layer as an outer electrode. FIG. 6B is a view corresponding to the Comparative Example 2 and illustrates a multilayer ceramic capacitor which includes, as an outer electrode, an underlying electrode layer and a conductive resin layer covering the entire surface of the underlying electrode layer. FIG. 6C is a view corresponding to a Comparative Example 3 and illustrates a multilayer ceramic capacitor which includes, as an outer electrode, an underlying electrode layer and a conductive resin layer extending to cover a portion of the underlying electrode layer located on the second main surface and a portion of the end surface and which includes a resin electrode area ratio of about 3%. FIG. 6D is a view corresponding to a Preferred Embodiment Example 1 and illustrates a multilayer ceramic capacitor which includes an outer electrode similar to the Comparative Example 3 and which includes a resin electrode area ratio of about 9%. FIG. 6E is a view corresponding to a Preferred Embodiment Example 2 and illustrates a multilayer ceramic capacitor which includes an outer electrode similar to the Comparative Example 3 and which includes a resin electrode area ratio of about 27%. FIG. 6F is a view corresponding to a Preferred Embodiment Example 3 and illustrates a multilayer ceramic capacitor which includes an outer electrode similar to the Comparative Example 3 and which includes a resin electrode area ratio of about 53%. FIG. 6G is a view corresponding to a Preferred Embodiment Example 4 and illustrates a multilayer ceramic capacitor which includes an outer electrode similar to the Comparative Example 3 and which includes a resin electrode area ratio of about 82%. FIG. 6H is a view corresponding to a Comparative Example 4 and illustrates a multilayer ceramic capacitor which includes an outer electrode similar to the Comparative Example 3 and which includes a resin electrode area ratio of about 96%.

The ESR was measured as follows. Before the measurement, the multilayer ceramic capacitor was heat-treated at about 150° C. for one hour in an air atmosphere and then mounted on a substrate for measurement. After 24±2 hours from the completion of the heat treatment, the ESR was measured at a measurement frequency of 1 MHz by a network analyzer.

The multilayer ceramic capacitor was mounted on a substrate by using a solder paste. Note that, regarding samples including the conductive resin layer, the main surface side on which the conductive resin layer was provided was specified as a mounting surface.

The substrate was pressed from a surface opposite to the mounting surface with a pushing rod including a diameter of about 5 mm to bend the substrate, thus applying a mechanical stress. At this time, the test was performed at a holding time of about 5 seconds with an amount of flexure of about 7 mm. After the bending of the substrate, the multilayer ceramic capacitor was removed from the substrate and polished in a direction perpendicular or substantially perpendicular to the first main surface and the second main surface. Cracks in the multilayer body were observed. The amount of flexure of the substrate of about 7 mm is a condition that is more severe than ordinary conditions.

A photograph of the end surface of the multilayer ceramic capacitor was taken with a microscope. The resulting image was analyzed by WinROOF (software) to calculate the total area of the end surface and the area of the conductive resin layer. The value determined by dividing the area of the conductive resin layer by the total area of the end surface was defined as the resin electrode area ratio, and the evaluation was performed.

The multilayer ceramic capacitor 10 is polished until an LT section in the longitudinal direction L and the lamination direction T is exposed at a position corresponding to half the length between the first side surface 12c and the second side surface 12d in the width direction W. Subsequently, an imaginary line is drawn to pass through the lowest point of the lower surface of the underlying electrode layer 24 provided on the second main surface 12b defining and functioning as the mounting surface and to be parallel or substantially parallel to the lower surface of the multilayer body 12. A perpendicular is further drawn from the imaginary line, and the height of the conductive resin layer 25 along the perpendicular is measured with a microscope. In addition, on the LT section, an imaginary line is drawn to pass through the highest point of the upper surface of the underlying electrode layer 24 provided on the first main surface 12a and to be parallel or substantially parallel to the upper surface of the multilayer body 12. The height of the underlying electrode layer 24 located on a perpendicular connecting the imaginary line drawn on the second main surface 12b defining and functioning as the mounting surface and the imaginary line drawn on the first main surface 12a is measured with the microscope. Here, a ratio of the height of the conductive resin layer 25 to the height of the underlying electrode layer 24 is calculated and defined as a resin electrode height ratio.

In the multilayer ceramic capacitors of Preferred Embodiment Examples 1 to 6, the metal component (conductive filler) of the conductive resin layer is Ag.

TABLE 1

| | Comparative Example 1 | Comparative Example 2 | Preferred Embodiment Example 1 | Preferred Embodiment Example 2 | Preferred Embodiment Example 3 | Preferred Embodiment Example 4 | Preferred Embodiment Example 5 | Preferred Embodiment Example 6 |
|---|---|---|---|---|---|---|---|---|
| Summary | Includes only underlying electrode layer | Includes underlying electrode layer and conductive resin layer (covering entire surface of underlying electrode layer) | Includes underlying electrode layer and conductive resin layer (extending from second main surface side to part of end surface) | Includes underlying electrode layer and conductive resin layer (extending from second main surface side to part of end surface) | Includes underlying electrode layer and conductive resin layer (extending from second main surface side to part of end surface) | Includes underlying electrode layer and conductive resin layer (extending from second main surface side to part of end surface) | Includes underlying electrode layer and conductive resin layer (extending from second main surface side to part of end surface) | Includes underlying electrode layer and conductive resin layer (extending from second main surface side to part of end surface) |
| Structure image view (Sectional schematic view before plating) | FIG. 6A | FIG. 6B | FIG. 6C | FIG. 6D | FIG. 6E | FIG. 6F | FIG. 6G | FIG. 6H |
| Resin electrode area ratio | 0% (Not covered) | 100% (Completely covered) | 3% | 9% | 27% | 53% | 82% | 96% |
| Resin electrode height ratio | 0% (Not covered) | 100% (Completely covered) | 2% | 9% | 26% | 52% | 81% | 96% |
| Crack occurrence rate of multilayer body in 7 mm (n = 10) | 10/10 | 2/10 | 8/10 | 0/10 | 0/10 | 0/10 | 0/10 | 1/10 |
| ESR (Measurement frequency: 1 MHz) | 17 mΩ | 53 mΩ | 17 mΩ | 18 mΩ | 18 mΩ | 18 mΩ | 19 mΩ | 50 mΩ |

The multilayer ceramic capacitors are able to be evaluated as follows on the basis of the experimental results in Table 1.

The multilayer ceramic capacitors in which the conductive resin layer extends onto the underlying electrode layer provided on the second main surface side, a portion of the second main surface, and a portion of the underlying electrode layer provided on each of the first end surface side and the second end surface side (Preferred Embodiment Examples 1 to 6) provided lower ESR than the Comparative Example 2 (the comparative example in which the conductive resin layer covers the entire surface of the underlying electrode layer).

Regarding the multilayer ceramic capacitors including a conductive resin layer including a resin electrode area ratio (the ratio of the area of the conductive resin layer to the area of each of the first end surface and the second end surface) of about 9% or more and about 82% or less, for example, (Preferred Embodiment Examples 2 to 5), out of ten samples, no sample included a multilayer body in which cracks were formed. Furthermore, regarding the multilayer ceramic capacitors including a conductive resin layer including a resin electrode area ratio of about 9% or more and about 82% or less, for example, the ESR was lower than that of the Comparative Example 2 (the comparative example in which the conductive resin layer covers the entire surface of the underlying electrode layer).

In the multilayer ceramic capacitors of Preferred Embodiment Examples 1 to 6, the conductive resin layer extends onto the underlying electrode layer provided on the second main surface side, a portion of the second main surface, and a portion of the underlying electrode layer provided on the first end surface side and the second end surface side.

In the multilayer ceramic capacitors of Preferred Embodiment Examples 1 to 6, the plating layer is provided on the underlying electrode layer and the conductive resin layer.

In contrast, regarding the Comparative Example 1, although the ESR was low because the conductive resin layer was not included, ten samples out of ten samples included a multilayer body in which cracks were formed.

Regarding the Comparative Example 2, the ESR was high because the conductive resin layer covered the entire surface of the underlying electrode layer. However, two samples out of ten samples included a multilayer body in which cracks were formed.

In the preferred embodiments and Preferred Embodiment Examples described above, multilayer ceramic capacitors have been described as examples of the multilayer ceramic electronic components according to various preferred embodiments of the present invention. However, the multilayer ceramic electronic components are not limited thereto. Specifically, the multilayer ceramic electronic components according to preferred embodiments of the present invention may be a piezoelectric component, a thermistor, or an inductor. When the multilayer ceramic electronic component is a piezoelectric component, piezoelectric ceramics may be included as a ceramic material. Specific examples of the piezoelectric ceramics include lead zirconate titanate (PZT) ceramics. When the multilayer ceramic electronic component is a thermistor, semiconductor ceramics may be included as a ceramic material. Specific examples of the semiconductor ceramics include spinel ceramics. When the multilayer ceramic electronic component is an inductor, magnetic ceramics may be included as a ceramic material. Specific examples of the magnetic ceramics include ferrite ceramics.

With regard to, for example, the mechanism, the shape, the material, the quantity, the position, or the arrangement, various modifications are able to be made to the preferred embodiments described herein without departing from the scopes of the technical idea and the object of the present invention, and modifications are also included in the present invention.

More specifically, for example, the underlying electrode layer 24 may extend, from the first end surface 12e and the second end surface 12f, only onto the second main surface 12b without extending onto the first main surface 12a, the first side surface 12c, or the second side surface 12d.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a multilayer body that includes a plurality of dielectric layers and a plurality of inner electrode layers, the dielectric layers and the inner electrode layers being laminated, and that includes first and second main surfaces opposite to each other in a lamination direction, first and second side surfaces opposite to each other in a width direction perpendicular or substantially perpendicular to the lamination direction, and first and second end surfaces opposite to each other in a longitudinal direction perpendicular or substantially perpendicular to the lamination direction and the width direction;
   a first outer electrode provided on the first end surface; and
   a second outer electrode provided on the second end surface; wherein
   the second main surface of the multilayer body defines and functions as a mounting surface;
   the first outer electrode includes a first underlying electrode layer and a first conductive resin layer;
   the second outer electrode includes a second underlying electrode layer and a second conductive resin layer;
   the first underlying electrode layer and the second underlying electrode layer each include a conductive metal and a glass component;
   the first conductive resin layer and the second conductive resin layer each include a thermosetting resin and a metal component;
   the first underlying electrode layer extends from the first end surface onto at least the second main surface;
   the second underlying electrode layer extends from the second end surface onto at least the second main surface;
   the first conductive resin layer extends onto the first underlying electrode layer provided on the second main surface, a portion of the second main surface, and a portion of the first underlying electrode layer provided on the first end surface;
   the second conductive resin layer extends onto the second underlying electrode layer provided on the second main surface, a portion of the second main surface, and a portion of the second underlying electrode layer provided on the second end surface; and
   each of the first conductive resin layer and the second conductive resin layer is absent from the first main surface such that no conductive resin layer is provided on the first main surface.

2. The multilayer ceramic electronic component according to claim 1, wherein
   the first conductive resin layer provided on the portion of the first underlying electrode layer provided on the first end surface covers a portion of the first end surface, the portion of the first end surface including an area corresponding to about 9% or more and about 82% or less of an area of the first end surface; and
   the second conductive resin layer provided on the portion of the second underlying electrode layer provided on the second end surface covers a portion of the second end surface, the portion of the second end surface including an area corresponding to about 9% or more and about 82% or less of an area of the second end surface.

3. The multilayer ceramic electronic component according to claim 1, wherein the metal component includes a Cu powder or a Ag powder.

4. The multilayer ceramic electronic component according to claim 1, wherein a plating layer is provided on the first and second underlying electrode layers and the first and second conductive resin layers.

5. The multilayer ceramic electronic component according to claim 1, wherein the multilayer body includes a rectangular parallelepiped or a substantially rectangular parallelepiped shape.

6. The multilayer ceramic electronic component according to claim 1, wherein corner portions defined by an intersection of one of the first and second main surfaces, one of the first and second side surfaces, and one of first and second end surfaces includes a rounded shape.

7. The multilayer ceramic electronic component according to claim 1, wherein ridge portions defined by an intersection between any two of the first and second main surfaces, the first and second side surfaces, and the first and second end surfaces includes a rounded shape.

8. The multilayer ceramic electronic component according to claim 1, wherein a material of each of the plurality of dielectric layers includes a dielectric ceramic.

9. The multilayer ceramic electronic component according to claim 1, wherein
   the plurality of dielectric layers includes a first outer layer portion located closest to the first main surface and a second outer layer portion located closest to the second main surface;
   the plurality of dielectric layers includes an inner layer portion located between the first outer layer portion and the second outer layer portion; and
   each of the plurality of dielectric layers of the inner layer portion is thinner than either of the first outer portion and the second outer layer portion.

10. The multilayer ceramic electronic component according to claim 1, wherein the plurality of inner electrode layers includes a plurality of first inner electrode layers and a plurality of second inner electrode layers that are alternately provided in the lamination direction.

11. The multilayer ceramic electronic component according to claim 10, wherein
    each of the plurality of first inner electrode layers includes a first facing-electrode portion and a first extended electrode portion;
    each of the plurality of second inner electrode layers includes a second facing-electrode portion and a second extended electrode portion;
    the first facing-electrode portions and the second facing-electrode portions at least partially overlap one another in a lamination direction;

each of the first extended electrode portions extends to and is exposed at the first end surface of the multilayer body; and each of the second extended electrode portions extends to and is exposed at the second end surface of the multilayer body.

12. The multilayer ceramic electronic component according to claim 1, wherein a percentage of an area of one of the plurality of inner electrode layers covering one of the plurality of dielectric layers, viewed from the lamination direction, is between about 50% and about 95%.

13. The multilayer ceramic electronic component according to claim 1, wherein the thermosetting resin of each of the first conductive resin layer and the second conductive resin layer is an epoxy resin.

14. The multilayer ceramic electronic component according to claim 1, wherein a content of the conductive filler in each of the first conductive resin layer and the second conductive resin layer is between about 35% and about 75%, by volume, of a total volume of the first conductive resin layer and the second conductive resin layer.

15. The multilayer ceramic electronic component according to claim 1, wherein at least one of the first conductive resin layer and the second conductive resin layer includes a rectangular or substantially rectangular shape.

16. The multilayer ceramic electronic component according to claim 1, wherein at least one of the first conductive resin layer and the second conductive resin layer includes a triangular or substantially triangular shape.

17. The multilayer ceramic electronic component according to claim 1, wherein at least one of the first conductive resin layer and the second conductive resin layer includes a curved shape.

18. The multilayer ceramic electronic component according to claim 17, wherein the curved shape is a fan shape.

19. The multilayer ceramic electronic component according to claim 1, wherein at least one of the first conductive resin layer and the second conductive resin layer includes a shape that is a combination of at least two of a rectangular or a substantially rectangular shape, a triangular or a substantially triangular shape, a curved shape, and a fan shape.

20. The multilayer ceramic electronic component according to claim 1, wherein a shape of the first conductive resin layer is different from a shape of the second conductive resin layer.

* * * * *